United States Patent [19]
Thirion de Briel

[11] Patent Number: 5,509,519
[45] Date of Patent: Apr. 23, 1996

[54] DIAPHRAGM CLUTCH MECHANISM OF THE PUSH-OFF TYPE, ESPECIALLY FOR MOTOR VEHICLES

[75] Inventor: Jacques Thirion de Briel, Colombes, France

[73] Assignee: Valeo, Paris, France

[21] Appl. No.: 284,489

[22] PCT Filed: Dec. 17, 1993

[86] PCT No.: PCT/FR93/01267

§ 371 Date: Sep. 8, 1994

§ 102(e) Date: Sep. 8, 1994

[87] PCT Pub. No.: WO94/13971

PCT Pub. Date: Jun. 23, 1994

[30] Foreign Application Priority Data

Dec. 17, 1992 [FR] France .................. 9215248

[51] Int. Cl.$^6$ .................................. F16D 13/71
[52] U.S. Cl. .................. 192/70.27; 192/89.23; 192/89.24
[58] Field of Search ............... 192/70.27, 89.23, 192/89.24

[56] References Cited

U.S. PATENT DOCUMENTS

| | | | |
|---|---|---|---|
| 2,359,104 | 9/1944 | Geyer | 192/70.27 |
| 3,595,355 | 7/1971 | Maucher et al. | 192/70.27 |
| 3,811,544 | 5/1974 | Maucher | 192/70.27 X |
| 4,241,819 | 12/1980 | Babcock et al. | 192/70.27 |
| 4,633,989 | 1/1987 | Yoneda . | |
| 4,744,448 | 5/1988 | Maycock et al. | 192/70.27 |
| 5,301,782 | 4/1994 | de Briel et al. | 192/70.27 |
| 5,377,803 | 1/1995 | Link et al. | 192/89.23 X |

FOREIGN PATENT DOCUMENTS

| | | | |
|---|---|---|---|
| 2242892 | 3/1975 | France | 192/89.23 |
| 2456877 | 5/1979 | France . | |
| 2585424 | 1/1987 | France . | |
| 3022595 | 1/1981 | Germany | 192/89.23 |

*Primary Examiner*—Andrea L. Pitts
*Attorney, Agent, or Firm*—Longacre & White

[57] ABSTRACT

The clutch mechanism comprises a cover plate (3), at least one pressure plate (100), a diaphragm (4) bearing on the cover plate (3), in which assembly means (5), having primary (54, 61) and secondary (60) abutments, are arranged to mount the diaphragm (4) for its deflection. The secondary abutment (60) is defined by a ring of elastic material capable of being hard and adherent after being deposited.

6 Claims, 6 Drawing Sheets

DIAPHRAGM CLUTCH MECHANISM OF THE PUSH-OFF TYPE, ESPECIALLY FOR MOTOR VEHICLES

The present invention is concerned with diaphragm clutches of the push-off type, especially for motor vehicles, and with diaphragm mechanisms for such clutches.

It will be recalled (FIGS. 1 to 3) that a clutch comprises a reaction plate 100, an annular cover plate 3 which is adapted to be secured to the said reaction plate 100, at least one annular pressure plate 2 coupled in rotation to the cover plate 20 and mounted for axial movement with respect to the latter, and an annular diaphragm 4, which, bearing on the cover plate 3, works axially on the pressure plate 2 in a direction for which the said plate is displaced away from the cover plate for contact with the friction pads 107 of a friction plate 102.

The reaction plate 100 is adapted to be secured, in particular by means of screw fasteners, to the crankshaft of the internal combustion engine, and commonly carries a starter crown, while the friction plate 102 has a hub 103 which is mounted in rotation, in this case by means of splines, with the input shaft 104 of the gearbox.

A single friction plate and a single pressure plate are provided here, but in a modification a plurality of plates 2 and plates 102 may be provided.

The friction pads 107 are conventionally secured to a support, and are adapted to be gripped, in the position in which the clutch is engaged (FIG. 1), between the plates 100, 2. The plate 102 in this example includes a torsion damping device. More precisely, the friction pads 107 extend axially on either side of the support, which is coupled to guide rings through spacing bars, with the said spacing bars securing the guide rings together.

These guide rings extend axially on either side of a damper plate, with springs 108, acting between them, being lodged partly in windows formed in facing relationship in the said guide rings and damper plate. The damper plate is secured, optionally with a clearance, to the hub 103 for rotation with the latter.

The support may of course be secured directly to the hub 103, and the clutch plate 102 may be rigid.

The diaphragm 4 has a resilient peripheral portion 41 defining a Belleville ring, and a central portion which is divided into radial fingers 42, which are separated from each other by slots. Since the clutch is of the push-off type, the said peripheral portion 41 in this example is mounted internally, in such a way that it can be deflected on the cover plate by the action of assembly means 5, which attach the diaphragm 4 to the cover plate 3 for deflecting movement, and which are carried by the latter, while radially further outwards it bears on an annular abutment 9 carried by the pressure plate 2 and defined, in this example, by a projecting ridge which is divided into annular sectors of the latter.

The fingers 42 are adapted to be manoeuvred in a thrust mode by a declutching member 105. In FIG. 1, this consists of a clutch release bearing 105, which includes a manoeuvring element adapted to be subjected to the action of a control member such as a declutching fork 106, and an actuating element which is adapted to act on the diaphragm, the said actuating element comprising a ball bearing, one of the rings of which is so configured as to work in a thrust mode on the ends of the fingers of the diaphragm 4, on the face of the latter which is directed towards the cover plate 3. For declutching (FIG. 2), it is therefore necessary to work in a thrust mode on the fingers 42 using the release bearing 105, so as to cause the diaphragm to deflect, disengage the clutch, and release the friction pads 107.

The cover plate 3, the pressure plate 2, and the diaphragm 4 constitute a clutch mechanism 1, which in this example is a single unit, the said pressure plate being coupled in rotation to the cover plate 3, and being mounted on the latter, in such a way that it can move axially, by means of tangential tongues 110 (FIG. 3), which are secured in a manner known per se, by means of rivets at one of their ends, to the cover plate 3, and at their other ends to lugs 109 of the pressure plate.

In a modification, the coupling between the plate 2 and cover plate 3, with the facility for axial movement, may be of the tenon and mortice type.

As is described for example in the documents FR-A-2 585 424 and FR-A-2 456 877, the assembly means 5 comprise retaining members (51 in FIG. 3) which are joined to the cover plate and which extend through the diaphragm via apertures formed in the latter, together with two annular abutments, namely a primary and secondary abutment respectively, in facing relationship with each other. The primary abutment is carried by the cover plate, while the secondary abutment is carried by the retaining members.

In the position in which the clutch is engaged, the diaphragm 4 is in engagement on the primary abutment, while in the position in which the clutch is disengaged, the diaphragm exerts a biassing force on the secondary abutment.

In the said documents, the assembly means 5 apply the diaphragm 4, with a gripping force, axially against the primary abutment in the position in which the clutch is engaged.

In certain cases, a problem occurs because this gripping action, by virtue of its friction, increases the friction effect of the diaphragm, so creating hysteresis phenomena during its deflecting movement between the primary and secondary abutments, and to that extent this gives rise to the wear which is inevitable when the diaphragm and abutments are in service with large variations in load.

In order to overcome these drawbacks, in the above mentioned document FR-A-2 585 424 it is arranged that the secondary abutment is formed in a crown ring of frusto-conical shape.

In the document FR-A-2 456 877, an arrangement is provided in which the diaphragm is displaced temporarily, resiliently away from its primary and secondary abutments as it is deflected.

All of this is satisfactory, but it may be desirable in certain applications to reduce the said hysteresis further. In addition, it may be desirable that the secondary abutment should yield elastically during operation of the clutch (i.e. when passing from the position in which the clutch is engaged to the position in which the clutch is disengaged) in the interests of comfort of the user, and so as to give progressive gripping action of the friction pads 107 during re-engagement of the clutch.

In order to resolve this problem, it may be thought that recourse can be had to arrangements of the same type as those which are described in the document FR-A-2 466 877 (especially in FIGS. 13 and 14).

These solutions do complicate the manufacture of the clutch, and in addition the elastic gripping action is not as precise as desired, since the load on a Belleville ring or on a corrugated ring is not easy to control.

This control of gripping is very important, especially as regards the lifting of the pressure plate and the declutching travel, so as to achieve good release of the friction pads of the friction plate.

An object of the present invention is to overcome these drawbacks, and accordingly to provide a novel assembly means having a resilient secondary abutment and with low, controllable hysteresis, while at the same time modifying the manufacture of the clutch as little as possible, and increasing the declutching travel as little as possible.

In accordance with the invention, a clutch mechanism of the type described above is characterised in that the secondary abutment is defined by a ring of elastic material capable of reticulation (a kind of polymerization to make a tridimensional network or linkage) and being adherent after being deposited.

Thanks to the reticulation of the resilient material, the latter hardens after being deposited, in such a way that the said abutment has only small variations in thickness when the clutch passes from its engaged position to its disengaged position. As a result, the declutching travel is not increased unduly, and the lift of the pressure plate is satisfactory. In addition, good deflection of the diaphragm is obtained with low values of hysteresis, due especially to the fact that the contact between the diaphragm and its secondary abutment is not metallic. Furthermore, during re-engagement of the clutch, the benefit is obtained of a certain degree of progressive action which is of value for the comfort of the user. The ring or band reduces noise during the deflection of the diaphragm, besides which, manufacturing tolerances of the components are less precise.

It will be appreciated that the manufacture of the clutch is easy, because it is sufficient to deposit a band, for example by means of a nozzle, either on the diaphragm or on an abutment member, in order to form the secondary abutment which, after this deposit has taken place, will reticulate and will fasten itself by adhering on the component concerned, for example by bonding.

The arrangement in accordance with the invention opens up a vast field of application, and it is possible for example to fix the secondary abutment on the diaphragm, together with the primary abutment which may be made as a mirror image of the secondary abutment. In all cases, fitting is facilitated because the secondary abutment constitutes a whole which can be handled and transported, either with the diaphragm or with its associated support member, or both.

The secondary abutment is preferably of an oblong shape, such that an elastic hinge for the diaphragm is formed. In addition, the axial deformation of the secondary abutment is minimised. The loss of lift of the declutching plate is thus minimised. Furthermore, manufacturing tolerances are less rigorous. In this connection, the secondary abutment is guaranteed to be in facing relationship to the primary abutment, for good deflection of the diaphragm.

The description that follows illustrates the invention with reference to the attached drawings, in which.

In the Figures shown, the clutch is a diaphragm clutch of the push-off type for a motor vehicle, such as is described above.

Figure 1:
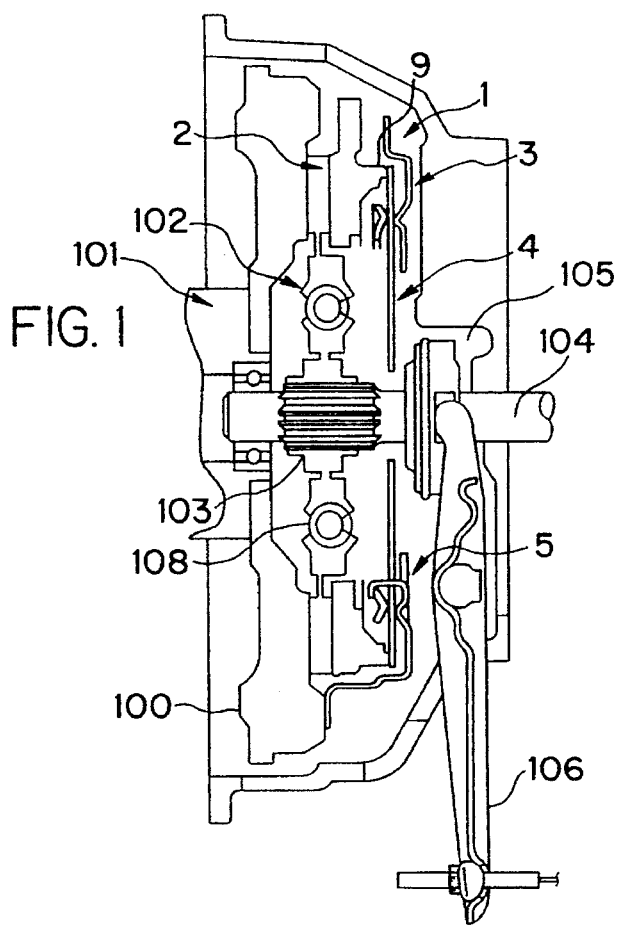
FIG. 1 is a view in axial cross section of a clutch of the push-off type in the prior art, for the position in which the clutch is engaged.
Figure 2:
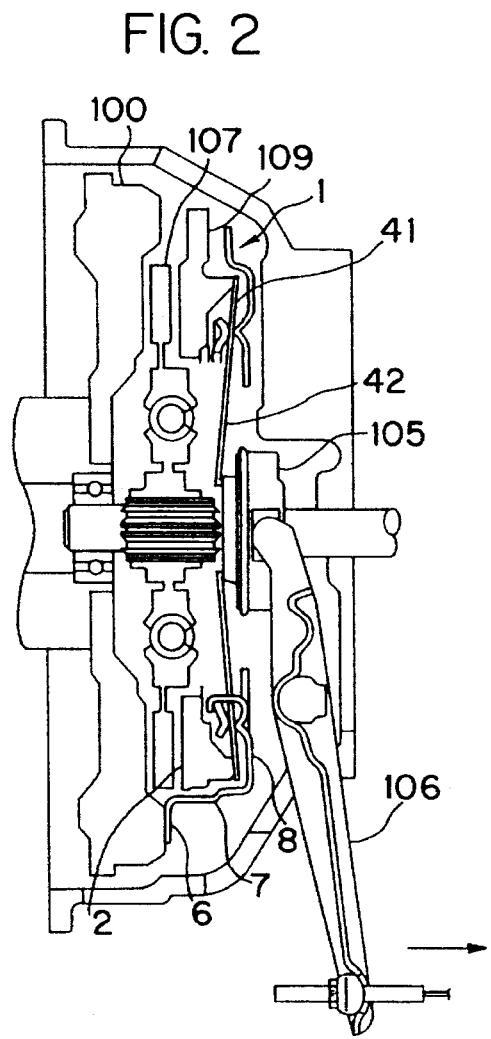
FIG. 2 is a view similar to FIG. 1 for the position in which the clutch is disengaged.
Figure 3:
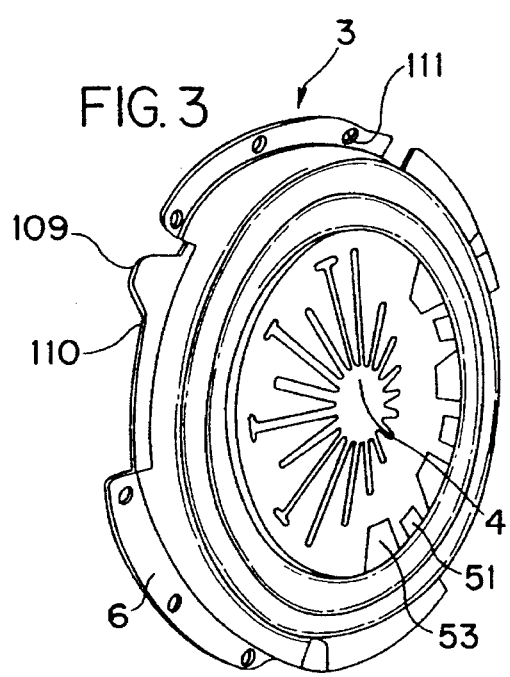
FIG. 3 is a perspective view of the clutch mechanism according to FIGS. 1 and 2.

In the said Figures, the cover plate 3, in this example of monobloc form, is generally in the form of a hollow plate with a radial securing flange 6 extending radially away from the axis of the assembly, and having holes 111 (FIG. 3) through which fastening members (in this example screw fasteners, not shown) pass. The said flange 6 is joined to an axially oriented skirt 7 which surrounds both the plate 2 and the pads 107; the said skirt 7 is joined to a base 8, which is perforated in the centre and carries an annular abutment 54 (FIG. 4) for the diaphragm 4.

The cover plate 3, the pressure plate 2 and the diaphragm 4 of the unitary clutch mechanism are annular components, and the same is true of the reaction plate 100, the clutch disc 102, and its friction pads 107.

In accordance with the invention, a clutch mechanism of the type described above is characterised in that its secondary abutment 60 is defined by a ring of material which is capable of reticulation and which is adherent after being deposited.

Figure 4:
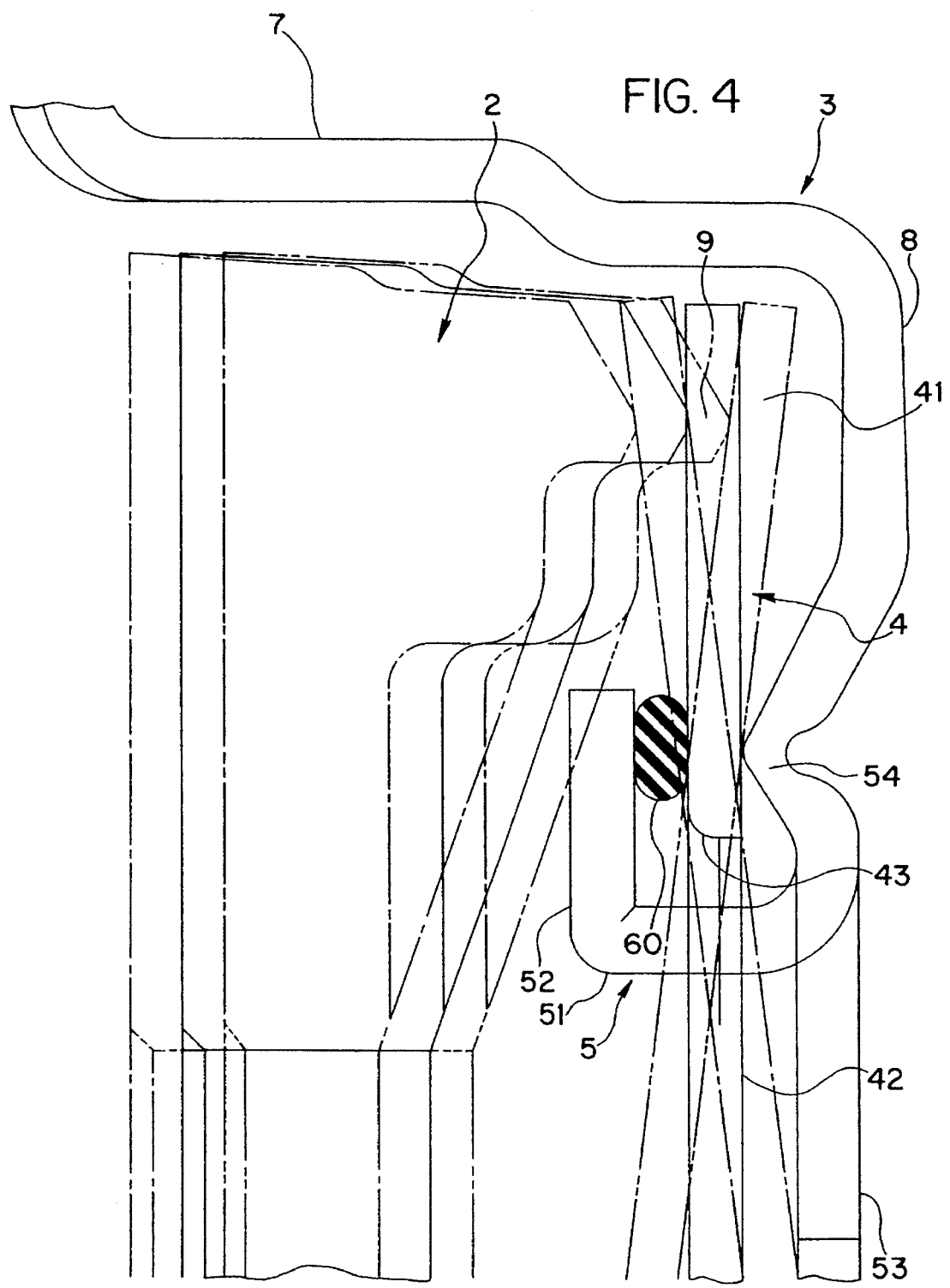
FIGS. 4 to 8 are views in axial cross section of part of a clutch mechanism equipped with the secondary abutment in accordance with the invention, in various embodiments.

More precisely, in FIG. 4, the assembly means 5 which mount the diaphragm 4 pivotally to the cover plate 3 comprise retaining lugs, which are relatively thin and flat and which are joined to the cover plate 3 and have an axial portion 51 passing through the diaphragm, via apertures 43 defined between its radial fingers 42 at the root of the said fingers, and a terminal wing portion 52 of the said axial portion 51, which is bent radially outwardly at its end after having passed through the aperture 43, so as to form a locating bend between the wing portion 52 and the axial portion 51. In this example, the lugs project directly from the cover plate. For more details, reference should be made to the document FR-A-2 585 424. The primary abutment 54 is defined by an annular bead press-formed in the base 8 of the cover plate, the said lugs of the assembly means 5 being joined to the said primary abutment 54 through a rounded portion. The primary abutment 54 is disposed radially outwardly of the said lugs 51, 52, being in contact with the internal portion of the Belleville ring 41 of the diaphragm, which is frustoconical in shape in the free state.

The secondary abutment according to the invention can be seen at 60, and this annular secondary abutment has an oblong shape with two parallel sides which are joined together through two semicircles at each of their ends. The abutment constitutes a band.

Although the primary abutment 54 gives line contact, the secondary abutment 60 has a greater contact area. In this example the abutment 60 is formed from a band of elastic material capable of reticulation and adhesion, which is deposited on the diaphragm using a nozzle, and in this example it is in the form of a heat resistant silicone paste from the company RHONE-POULENC, sold under the Trade Mark "Rhodorseal".

Thus, using the nozzle, it is possible to guarantee the thickness of this band, which will in this example adhere to the diaphragm by bonding. The method of assembly is thus easy because it is sufficient to mate together the diaphragm 4 with the secondary abutment 60 bonded on to the lugs 51, 52 of the assembly means 5, which are not yet bent over, and then to bend the ends of the lugs radially over.

It will be appreciated that the configuration of this secondary abutment, which is oriented radially and has a greater contact area than the primary abutment 54, leads to certainty that the primary abutment 54 will be in facing relationship to the secondary abutment 60, which is favourable to good deflection of the diaphragm.

In addition, the bending of the lugs 51, 52 so as to form the wing portion 52 is easy, there being no Belleville ring that has to be compressed. In addition, the distance between the diaphragm and this wing portion 52 is easy to control.

After the material of the abutment 60 has been reticulated, the latter is hardened in such a way that it undergoes hardly any deformation during operation of the clutch.

In this FIG. 4, the various positions of the diaphragm and of the pressure plate 2 have been shown. With the expression "new clutch" showing the position of the pressure plate 2 and of the diaphragm (substantially vertical) when the friction pads 107 are "new", the position "disengaged (new)" shows the position of the said components 2 and 4 when the clutch is disengaged, its pads 107 being new. The expression "unassembled" shows the position of the various components of the mechanism when the mechanism 1 is not yet fixed on the reaction plate 100, with the diaphragm then bearing on radial retaining lugs 53 of the base 8 of the cover plate, the said lugs 53 being in circumferential alternation with the lugs 51, 52 of the assembly means 5, as can be seen in particular in FIG. 3.

In the position in which the clutch is engaged, the diaphragm 4, constituting axially acting resilient means, bears on the primary abutment 54, with its secondary abutment then carrying no load. In this position, the secondary abutment 60 applies the diaphragm 4 axially, with a gripping force, against the primary abutment 54.

During the operation of the clutch, the primary abutment is not under load, while the secondary abutment 60 is under load, with the latter being squeezed at the end of the declutching operation.

It will be appreciated that this elastic abutment enables clearances to be taken up and noise to be reduced.

Figure 6:
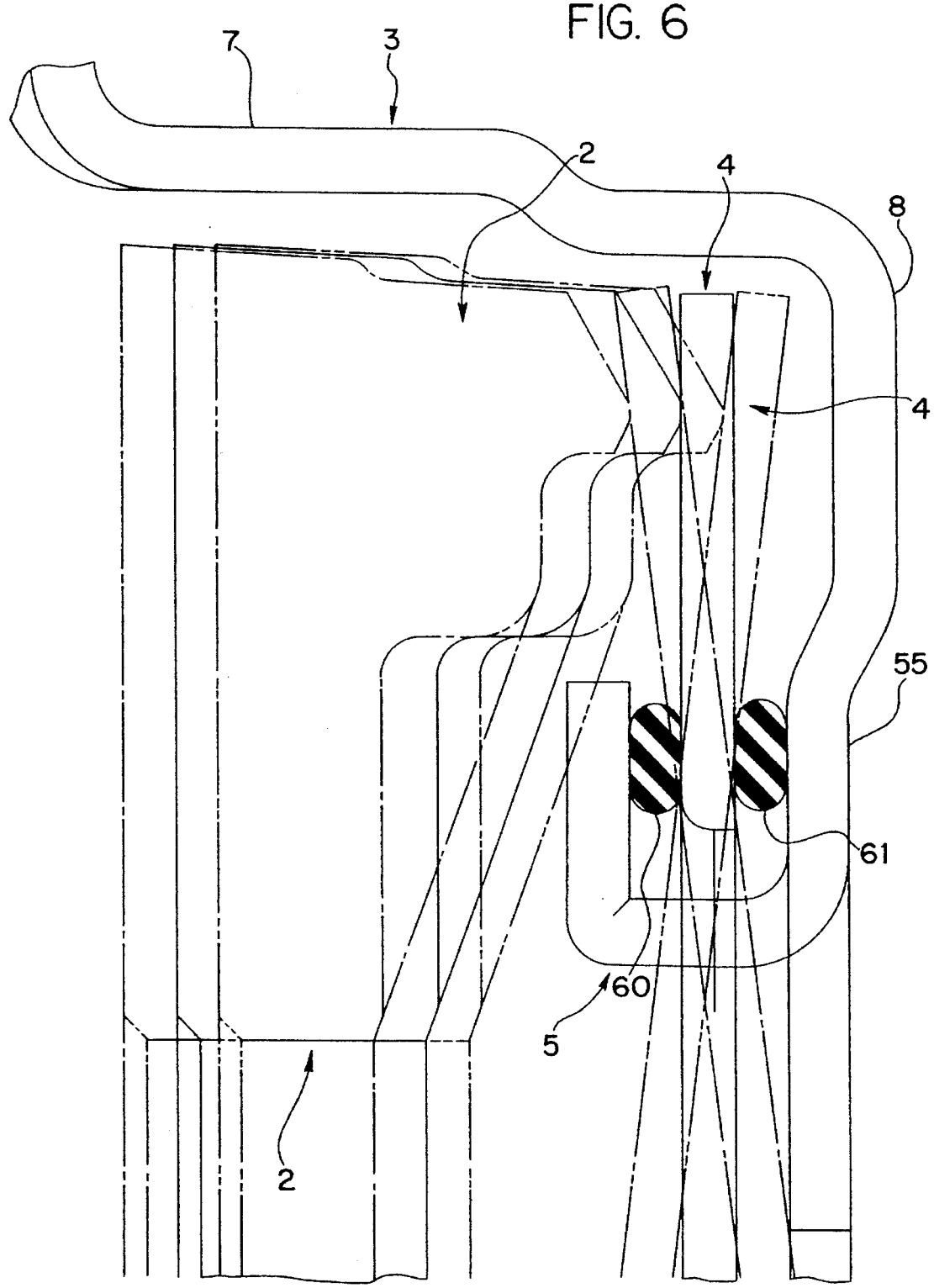

The primary abutment can of course be the mirror image of the secondary abutment, and accordingly, in FIG. 6 the primary abutment 61 is defined by a ring of material capable of being reticulated and adherent after being deposited.

In this Figure, the two abutments are bonded on to the diaphragm 4 at the inner periphery of its Belleville ring 41, and on either side of the latter, while the cover plate 8 is simplified because it is no longer formed with pressed-out portions, the latter being replaced by a flat portion 55, which is offset axially towards the pressure plate with respect to the outer periphery of the base 8.

It will be appreciated that the primary abutment 61 enables vibrations which occur, in particular by virtue of the axial movement of the crankshaft when the clutch is engaged at dead centre, to be absorbed.

Figure 5:
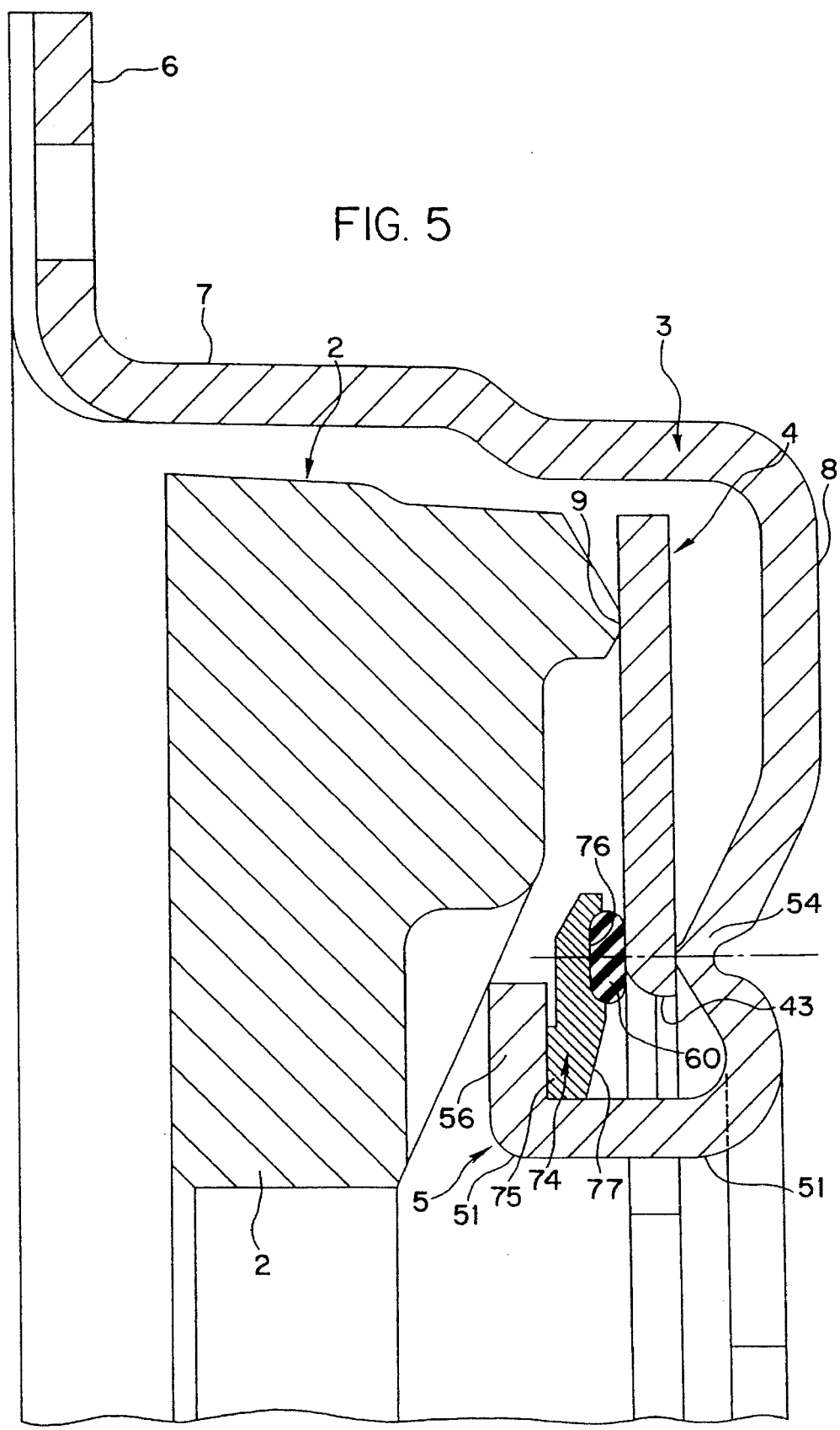

Although in FIG. 4 the contact between the secondary abutment and the assembly lugs was discontinuous, in FIG. 5 it is possible to make this abutment continuous using a support crown 74. This support crown has at its outer periphery a seating 76 which hugs the shape of the secondary abutment 60, while at its inner periphery it has a claw 75 for contact with the radial end 56 of the assembly lugs 51, at the base of the said end. This seating 76 prevents peeling of the secondary abutment 60, which, as in FIG. 4, is in contact with the Belleville ring 41 through one of its flat sides of its oblong shape.

The said crown is centred at its inner periphery by the axial portion 51 of the lugs, and it has, on that one of its faces which is directed towards the diaphragm an oblique portion 77 which gives proper deflection of the diaphragm 4.

In this Figure, the band 60 is deposited, using a nozzle, in the seating 76 which constitutes a mould, the secondary abutment 60 being accordingly fixed to the crown 74. The enveloping shape of the seating 76 will be noted, this being such that axial deformation of the secondary abutment is minimised.

It will be appreciated that this arrangement calls for no modification of the tooling. It is of course possible to modify the tooling slightly, in particular in order to elongate the assembly lugs.

Figure 8:
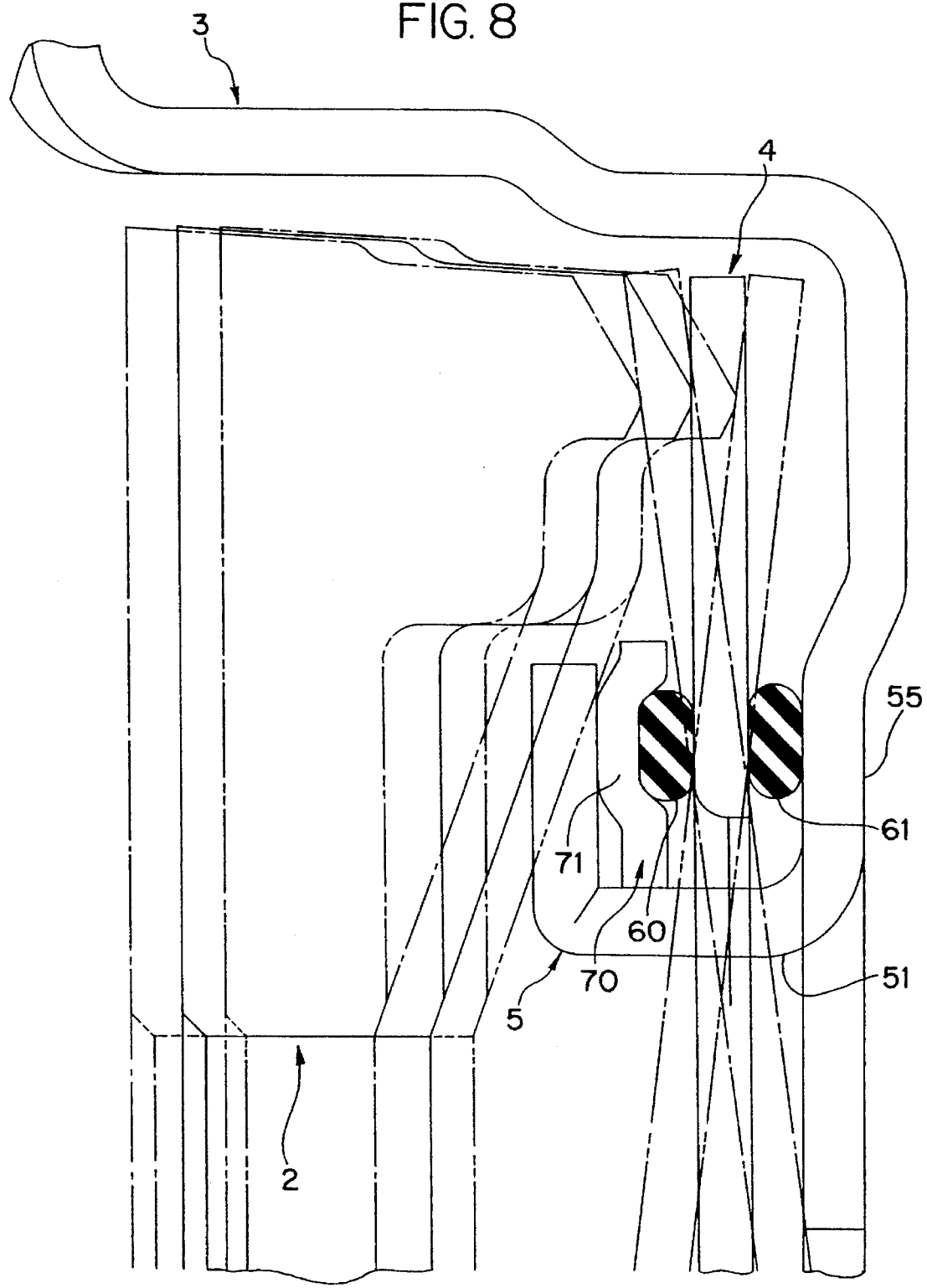

As can then be seen in FIG. 8, the secondary abutment 60 is again fixed to its support crown 70, which is centred at its inner periphery on the axial lugs 51, but in this example it is the seating 71 for the secondary abutment 60 that is in direct contact with the radial end 56 of the assembly lugs. This crown 70 is therefore less bulky than before, without an oblique portion, and can be made by press-forming.

The primary abutment (FIG. 7) can of course be formed using a band of elastic material 61 deposited in a seating formed in a member 80, which is of convex form in rocking contact with the base 8 of the cover plate.

The secondary abutment 60 is identical to that in FIG. 5. In this case, the band 61 may be secured to the diaphragm 4, as may also be the band 60.

As will have been understood, the invention opens the way to a large number of combinations, and is not limited to the examples shown.

Figure 7:
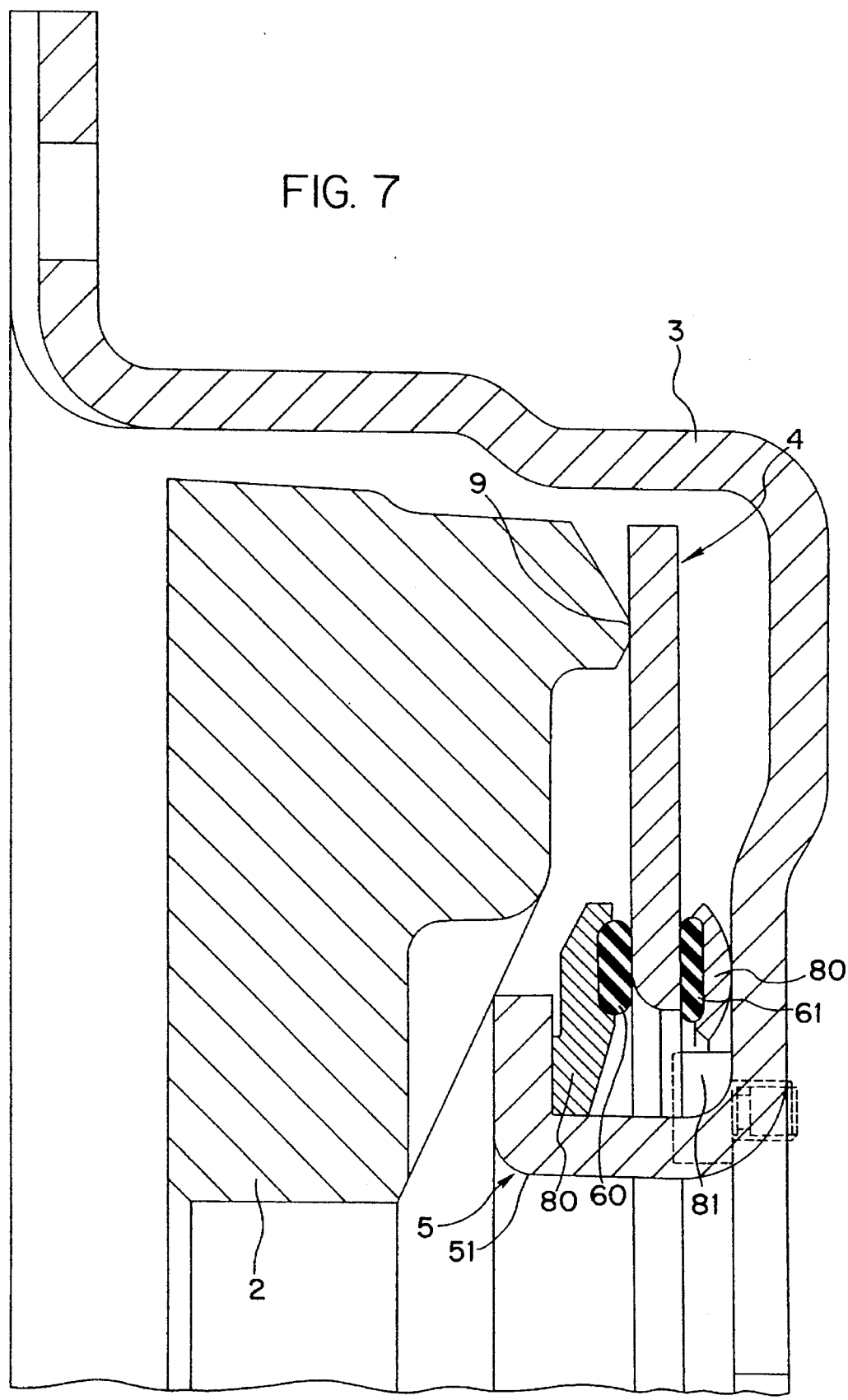

In particular, the retaining members may consist of clips as can be seen in FIG. 7 of the document FR-A-2 466 877. These lugs may also have the configuration seen in FIG. 10 of the above mentioned document, and in that case it is necessary to have a crown for carrying the secondary abutment.

It is also possible to divide the secondary abutment and/or the primary abutment. In summary, the assembly means 5 comprise, firstly, retaining members which are applied to the cover plate, for example by clipping or riveting, or which are integral with the said cover plate, and secondly, annular primary and secondary abutments which are disposed on either side of the diaphragm, with the primary abutment being adjacent to the cover plate 3 and the secondary abutment being the one further away from the latter.

Thanks to the invention, the secondary abutment can be carried by the diaphragm (FIG. 4 for example), or by the retaining members (FIG. 5 for example), or by both at once (FIG. 5 for example), due to the adhesion of the secondary abutment, with an elastic hinge being formed.

The primary abutment may be carried by the cover plate and/or by the diaphragm.

I claim:

1. A clutch mechanism comprising an annular cover plate (3) which is secured to a reaction plate (100), at least one annular pressure plate (2) coupled in rotation to the cover plate (3) and mounted for axial movement with respect to the coverplate, and an annular diaphragm (4) which, bearing on the cover plate (3), works axially on the pressure plate (2) in a direction for which said plate (2) is displaced away from the cover plate (3) for contact with friction pads (107) of a friction plate (102), wherein the diaphragm (4) has a peripheral portion defining a Belleville ring (41) and a central portion which is divided into radial fingers (42), said peripheral portion (41) being mounted for deflection on the cover plate (3) by assembly means (5) which mount the diaphragm (4) deflectably on the cover plate (3), and which include retaining members (51) joined to the cover plate (3), and primary (54, 61) and secondary (60) annular abutments disposed on said side of the diaphragm (4), with the primary abutment adjacent to the cover plate (3), while the radial fingers (42) are manoeuvred in a thrust mode by a declutching member (105), characterized in that the secondary abutment (60) is defined by a ring of elastic material being hard and adherent after being deposited.

2. A mechanism according to claim 1, characterised in that the secondary abutment (60) has an oblong shape.

3. A mechanism according to claim 2, characterised in that the secondary abutment (60) is adhesively secured to the diaphragm (4).

4. A mechanism according to claim 1, in which the retaining members consist of retaining lugs which are relatively thin and flat, being part of the cover plate (2) and having an axial portion (51) extending through the diaphragm (4), and a terminal wing portion (52) of said axial portion (51), which is bent radially outwardly at its end after passing through the diaphragm (4), characterized in that the secondary abutment (60) is adhesively secured to a support crown (70, 74) having a seating (71, 76) defining a mould and in that said support crown (70, 74) is centered at its inner periphery on the axial lugs (51) and is in contact with the terminal wing portion (52).

5. A mechanism according to claim 4, characterized in that the support crown has at its outer periphery a seating (76) which hugs the shape of the secondary abutment (60), while at its inner periphery it has a claw (75) for contact with the terminal wing portion (52) and in that the face of said support crown (74) which is directed towards the diaphragm has an oblique portion (77) which gives proper deflection of the diaphragm (4).

6. A clutch mechanism comprising an annular cover plate which is secured to a reaction plate, at least one annular pressure plate coupled in rotation to the cover plate and mounted for axial movement with respect to the cover plate, and an annular diaphragm which, bearing on the cover plate, works axially on the pressure plate in a direction for which said pressure plate is displaced away from the cover plate for contact with friction pads of a friction plate, wherein the diaphragm has a peripheral portion defining a Belleville ring and a central portion which is divided into radial fingers, said peripheral portion being mounted for deflection on the cover plate by assembly means which mount the diaphragm deflectably on the cover plate, and which include retaining members joined to the cover plate, and primary and secondary annular abutments disposed on each side of the diaphragm, with the primary abutment adjacent to the cover plate, while the radial fingers are adapted to be manoeuvred in a thrust mode by a declutching member, wherein the secondary abutment is defined by a ring of elastic material being hard and adherent after being deposited on the diaphragm, characterized in that the primary abutment (61) is a mirror image of the secondary abutment (60).

* * * * *